United States Patent [19]
Shin

[11] Patent Number: 5,903,111
[45] Date of Patent: May 11, 1999

[54] CRT PROTECTIVE CIRCUIT

[75] Inventor: Hyun-Gook Shin, Incheon, Rep. of Korea

[73] Assignee: Daewoo Electronics Co., Ltd., Seoul, Rep. of Korea

[21] Appl. No.: 08/861,320

[22] Filed: May 21, 1997

[30] Foreign Application Priority Data

May 21, 1996 [KR] Rep. of Korea ....................... 96-17250

[51] Int. Cl.[6] .................................................. H01J 29/52
[52] U.S. Cl. ......................... 315/381; 315/411; 348/378
[58] Field of Search .................................... 315/381, 411; 348/378

[56] References Cited

U.S. PATENT DOCUMENTS 5,184,225  2/1993  Heidebroek et al. .................... 315/381
5,682,083  10/1997  Shin ........................................ 315/381

Primary Examiner—Theodore M. Blum
Attorney, Agent, or Firm—Pillsbury Madison & Sutro LLP

[57] ABSTRACT

A CRT protective circuit capable of eliminating spots during a mode conversion operation includes a microprocessor for generating a mute signal according to externally-provided horizontal and vertical sync signals, and a high voltage generating section for generating a high voltage according to an operation of a flyback transformer. A first switching section is switched according to the mute signal for supplying the high voltage of the high voltage generating section to a grid terminal, and a high voltage dropping section divides the output voltage of the high voltage generating section according to the switching status of the first switching section and supplies the dividing voltage to the grid terminal to control brightness of the spots. A second switching section is switched according to the mute signal for supplying an externally-supplied power supply, and a charging section charges/discharges an output voltage of the second switching section and supplies the backward potential of the discharging voltage to the grid terminal to eliminate the spots. Thus, the spots are eliminated during the mode converting operation to protect the CRT.

9 Claims, 4 Drawing Sheets

CRT PROTECTIVE CIRCUIT

BACKGROUND OF THE INVENTION

1. Field of the Invention

The present invention relates to a monitor, and more particularly to a CRT protective circuit for eliminating spots in accordance with a mute signal during the power off or mode converting operation.

2. Description of the Prior Art

Once a power switch of a general monitor is on, a cathode of an electron gun is heated and electron beam is emitted from the heated cathode. Then, the emitted electron beam collides into a phosphor layer to produce a spot.

This spot is deflected right to left in accordance with a deflection signal to form a raster, and brightness of the spot is changed to constitute a picture.

In more detail, the quantity of electron radiated from a cathode is controlled in accordance with the quantity of current flowing through a flyback transformer, and the brightness of the spot is determined in accordance with the quantity of the controlled electron. Also, the greater negative voltage supplied to a grid terminal is, the smaller quantity of electron is emitted from the cathode to make the picture dark.

Meantime, when the power switch of the monitor is off or mode is converted, a muting operation is performed at the initial time. This muting operation is for supplying a voltage which is lower than a voltage for normally operating respective circuits, e.g., a horizontal deflection circuit, a vertical deflection circuit, a video processor and a heater. A mute signal for executing the muting operation is generated from a microprocessor in accordance with an input of horizontal and vertical sync signals.

In other words, from the microprocessor, a mute signal of a low potential level, e.g., of about zero volt, is produced during the normal operation of respective circuits, and a mute signal of a high potential level, e.g., of about 5 volts, is provided for a predetermined time period in case of the power off or mode conversion state. This mute signal of high potential level lowers a voltage of the grid terminal. Therefore, the quantity of electron emitted from the cathode to the phosphor layer is decreased to make the spot be dimmed, thereby darkening the picture.

The monitor is generally furnished with a CRT protective circuit for protecting the CRT from the spot produced during the on/off operation of the power switch and mode converting operation, and such a CRT protective circuit includes a spot killer circuit and a muting circuit.

The conventional CRT protective circuit is constructed as shown in FIGS. 1 and 2.

In FIG. 1, a reference numeral 10 denotes a high voltage generating section for generating a high voltage resulting from the operation of a flyback transformer FBT and supplying the generated high voltage to a grid terminal G1 of a CRT. A reference numeral 20 denotes a microprocessor which provides a mute signal OUT1 for controlling the brightness of the spot in accordance with externally-provided horizontal and vertical sync signals Hs and Vs and a suspend signal OUT2 for eliminating the spot.

A reference numeral 30 denotes a mute signal processing section for controlling the brightness of the spot by controlling the magnitude of an input voltage of grid terminal G1 in accordance with mute signal OUT1; and 40 is a spot killer section for eliminating the spot by controlling the input voltage of grid terminal G1 in accordance with suspend signal OUT2.

The construction of the CRT protective circuit will be described more specifically with reference to FIG. 2 hereinbelow. High-voltage generating section 10 includes a diode 11 for biasing an output voltage of flyback transformer FBT and a capacitor 12 for flattening an output voltage of diode 11.

When being described in more detail, the mute signal processing section 30 is formed as follows. An emitter side of a transistor 32 which is switched in accordance with mute signal OUT1 supplied via a resistor 31 is connected with a resistor 33 for controlling the quantity of output current of transistor 31. The other side of resistor 33 is connected to an input terminal of power supply Vcc1, of about 5 volts. A collector side of transistor 32 is connected to a base side of a transistor 34 which is switched in view of the switching status of transistor 32, and a diode 35 for hindering the input voltage supply of grid terminal G1 toward an emitter of transistor 34 is connected between the emitter side of transistor 34 and grid terminal G1. A collector side of transistor 34 is connected to an output side of capacitor 12 of high voltage generating section 10. Between the collector side of transistor 34 and grid terminal G1, resistors 36 and 37 are connected in parallel for dividing an output voltage of capacitor 12 of high voltage generating section 10 in accordance with the switching status of transistor 34, and then supplying the divided voltage to grid terminal G1.

On the other hand, in describing the construction of spot killer section 40 in more detail, a collector side of a transistor 42 which is switched in accordance with suspend signal OUT2 supplied via a resistor 41 is connected with a resistor 43 which controls output current of transistor 42. The other side of resistor 43 is connected with an input terminal of a power supply Vcc2 of about 24 volts.

The collector side of transistor 42 is also connected with a base side of a transistor 44 which is switched in accordance with the switching status of transistor 42, and a collector side of transistor 44 is connected with a base side of a transistor 45 which is switched in accordance with the switching status of transistor 44. A resistor 46 for controlling output current of transistors 44 and 45 is connected between an emitter side of transistor 44 and collector side of transistor 44, and one side of resistor 46 is connected with an input terminal of a power supply Vcc3 of about 200 volts. An emitter side of transistor 45 is connected with a capacitor 47 which charges/discharges power supply Vcc3 in accordance with the switching status of transistor 45, and an output side of capacitor 47 is connected with an anode of a diode 48 which prevents the supply of an output voltage of capacitor 47 to a ground. An output side of capacitor 47 is connected with a resistor 49 which biases the output voltage of capacitor 47 to supply it to grid terminal G1. An emitter side of transistor 42, the other side of resistor 46 and a cathode of diode 48 are grounded.

The above enumerated conventional CRT protective circuit is operated and effected as below.

The high voltage of flyback transformer FBT is supplied diode 11 of high voltage generating section 10 to be subjected to shaping and the shaped high voltage is supplied to capacitor 12 which then flattens the shaped high voltage. Here, the flattened high voltage is approximately −80 volts.

When the monitor is in a normal mode, microprocessor 20 provides mute signal OUT1 of low level which is in turn supplied to transistor 32 via resistor 31. Transistor 32 is then switched under the turn-on state to provide a switching signal of high level.

The switching signal of high level is supplied to transistor 33 which becomes switched in the turn-off state.

Accordingly, the output voltage of capacitor 12 is supplied to resistors 36 and 37 to be divided in resistors 36 and 37, and the divided voltages are supplied to grid terminal G1. At this time, the divided voltage is approximately −60 volts.

However, mute signal OUT1 goes to the high level when the power switch is turned off or mode is converted, and mute signal OUT1 of high level is supplied to transistor 32 via resistor 31. Transistor 32 then is switched in the turn-off state to provide the switching signal of low level.

The switching signal of low potential level is supplied to transistor 33 which thus is switched in the turn-on state. Accordingly, the output voltage of capacitor 12 is supplied to grid terminal G1 via transistor 34 and diode 35, and the supply voltage of grid terminal G1 is approximately −80 volts, which is almost the same as the output voltage of capacitor 12.

Briefly, while the power switch is turned off or mode is converted, the high voltage of grid terminal G1 is lowered from −60 volts to −80 volts according to mute signal OUT1 of microprocessor 20, thereby darkening the picture.

Especially, when the power switch is turned off and the heated cathode of the CRT is not thoroughly cooled down, an electrostatic capacitance is left between an inner conductive layer and an outer conductive layer of the CRT. Then, the electron emitted from the cathode due to the remaining electrostatic capacitance continuously collides into the phosphor layer to create the spots.

However, since the deflection circuit is not operated, the electrons emitted onto the phosphor layer are forcibly moved toward the central portion of the phosphor layer continuously to severely damage the central portion of the phosphor layer. Due to this fact, spot killer circuit 40 is additionally connected to the CRT since the muting operation cannot decrease the damage upon the phosphor layer. Spot killer circuit 40 functions for lowering the high voltage of grid terminal G1, and the spot becomes dimmed by the lowered high voltage.

More specifically, when the monitor is of the normal mode, microprocessor 20 provides suspend signal OUT2 of high level. Then, suspend signal OUT2 of high level is supplied to transistor 42 via resistor 41, transistor 42 is switched in the turn-on state, and power supply Vcc2 is supplied to the emitter side of transistor 42 via resistor 43. Consequently, transistor 42 provides the switching signal of low level.

The switching signal of low level is supplied to transistor 44 which is in turn switched in the turn-off state to provide the switching signal of high level. The switching signal of high level is supplied to transistor 45 which is then switched in the turn-on state. Accordingly, power supply Vcc3 is supplied to capacitor 47 via transistor 45, and capacitor 47 charges power supply Vcc3.

Once the power switch is switched in the turn-off state, suspend signal OUT2 is transited to the low level, and suspend signal OUT2 of low level is supplied to transistor 42 via resistor 41. Also, transistor 42 is switched in the turn-off state, and power supply Vcc2 is supplied to the base side of transistor 44 via resistor 43. As the result, transistor 42 provides the switching signal of high level.

The switching signal of high level is supplied to transistor 44 which is thus switched in the turn-on state to provide the switching signal of low level. The switching signal of low level is supplied to transistor 45 which is then switched in the turn-off state. By doing so, power supply Vcc3 becomes grounded via resistor 46. Here, the charging voltage of capacitor 47 is supplied to diode 48 to be inverted to have the backward potential, and the inverted charging voltage of capacitor 47 is supplied to grid terminal G1 via resistor 49. Hence, the potential of grid terminal G1 is lowered with the spot dimming.

That is, in the normal mode, microprocessor 20 provides mute signal OUT1 of low level and suspend signal OUT2 of high level. Also, when the power switch is switched in the turn-off state, microprocessor 20 provides mute signal OUT1 of high level and suspend signal OUT2 of low level. By these operation, the potential of grid terminal G1 is lowered to thoroughly weaken the spot.

However, during the mode converting operation, since microprocessor 20 provides mute signal OUT1 of high level and suspend signal OUT2 of high level, the potential of grid terminal G1 becomes −80 volts. Because of the potential of grid terminal G1, the spot cannot be thoroughly weakened.

SUMMARY OF THE INVENTION

It is an object of the present invention to provide a CRT protective circuit capable of eliminating spots during a mode converting operation.

To achieve the above object of the present invention, there is provided a CRT protective circuit which includes a microprocessor for generating a mute signal in accordance with externally-provided horizontal and vertical sync signals, and a high voltage generating section for generating a high voltage in accordance with an operation of a flyback transformer. Also included parts are a first switching section switching in accordance with the mute signal for supplying the high voltage of the high voltage generating section to a grid terminal, and a high voltage dropping section which divides the output voltage of the high voltage generating section in accordance with the switching status of the first switching section and supplies the dividing voltage to the grid terminal to control brightness of the spots. In addition to these, a second switching section is switched in accordance with the mute signal for supplying an externally-supplied power supply, and a charging section charges/discharges an output power supply of the second switching section and supplies the backward potential of the discharging voltage to the grid terminal to eliminate the spots.

According to the preferred embodiment of the present invention, during the mode converting operation, the mute signal of high level is provided from the microprocessor, which is supplied to the first switching section and second switching section. The first switching section is switched in accordance with the mute signal of high level to supply the high voltage of the high voltage generating section to the grid terminal. Consequently, the brightness of the spot becomes dimmed. Meanwhile, the second switching section is switched in accordance with the mute signal of high level to supply the externally-provided power supply to the charging section. Then, the charging section charges/discharges the power supply, and the discharging voltage is shaped into the backward potential. The shaped backward potential is supplied to the grid terminal. As the result, the potential of the grid terminal is lowered to eliminate the spot, thereby making it possible to protect the CRT.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

A CRT protective circuit according to the present invention will be described in detail with reference to FIGS. 3 and 4.

Figure 1:
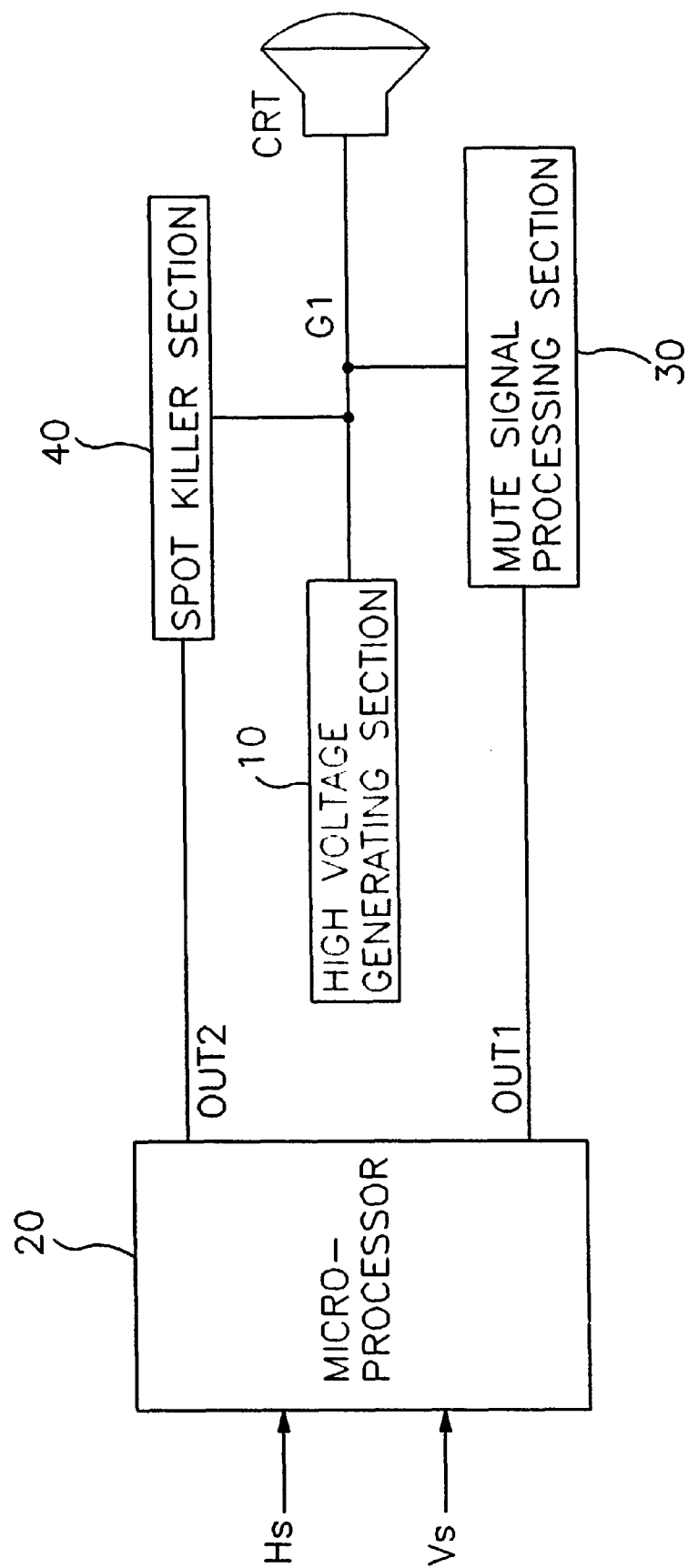
FIG. 1 is a block diagram showing a construction of a conventional CRT protective circuit.
Figure 2:
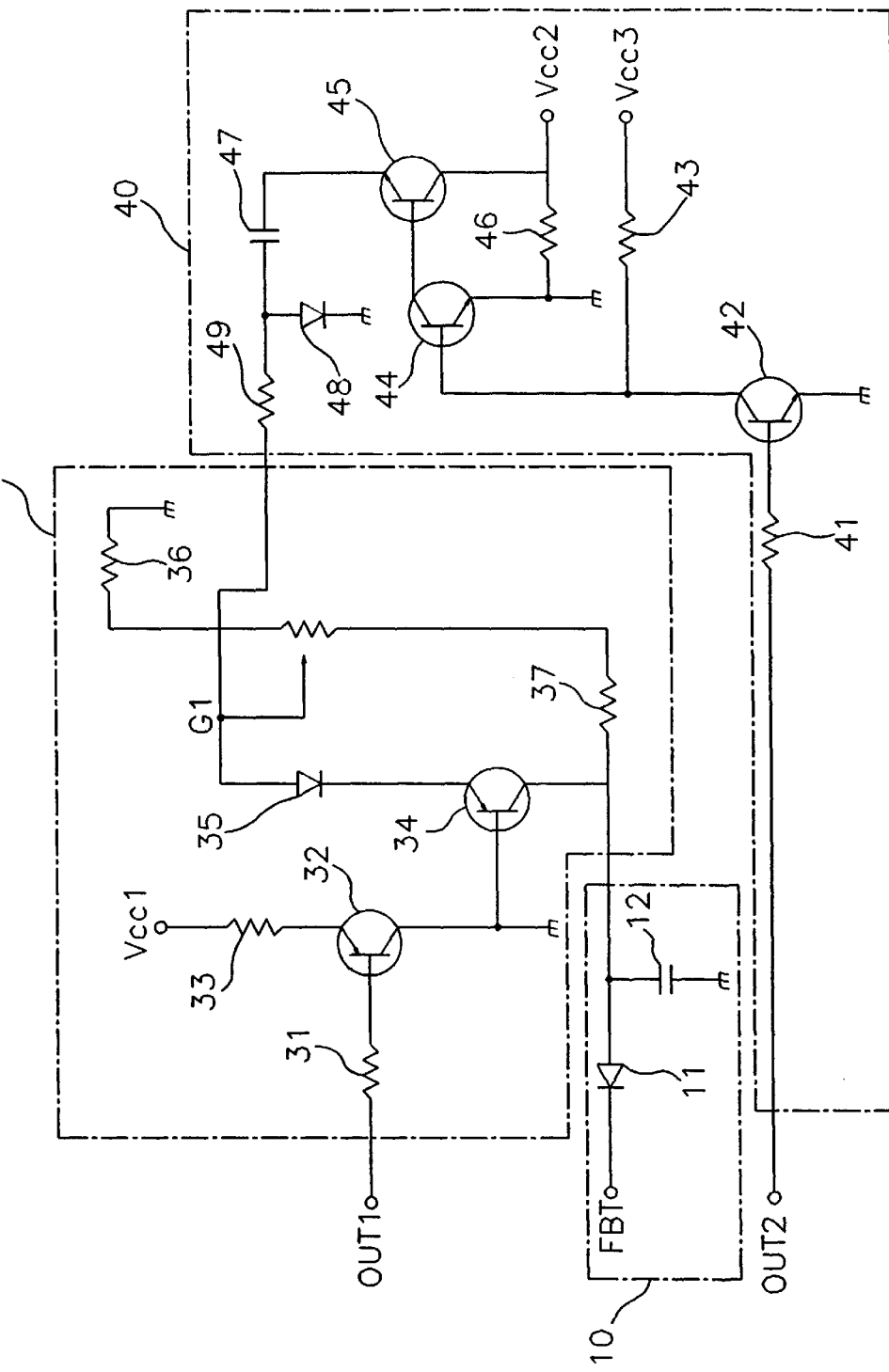
FIG. 2 is a view showing the construction of the CRT protective circuit of FIG. 1 in detail.
Figure 3:
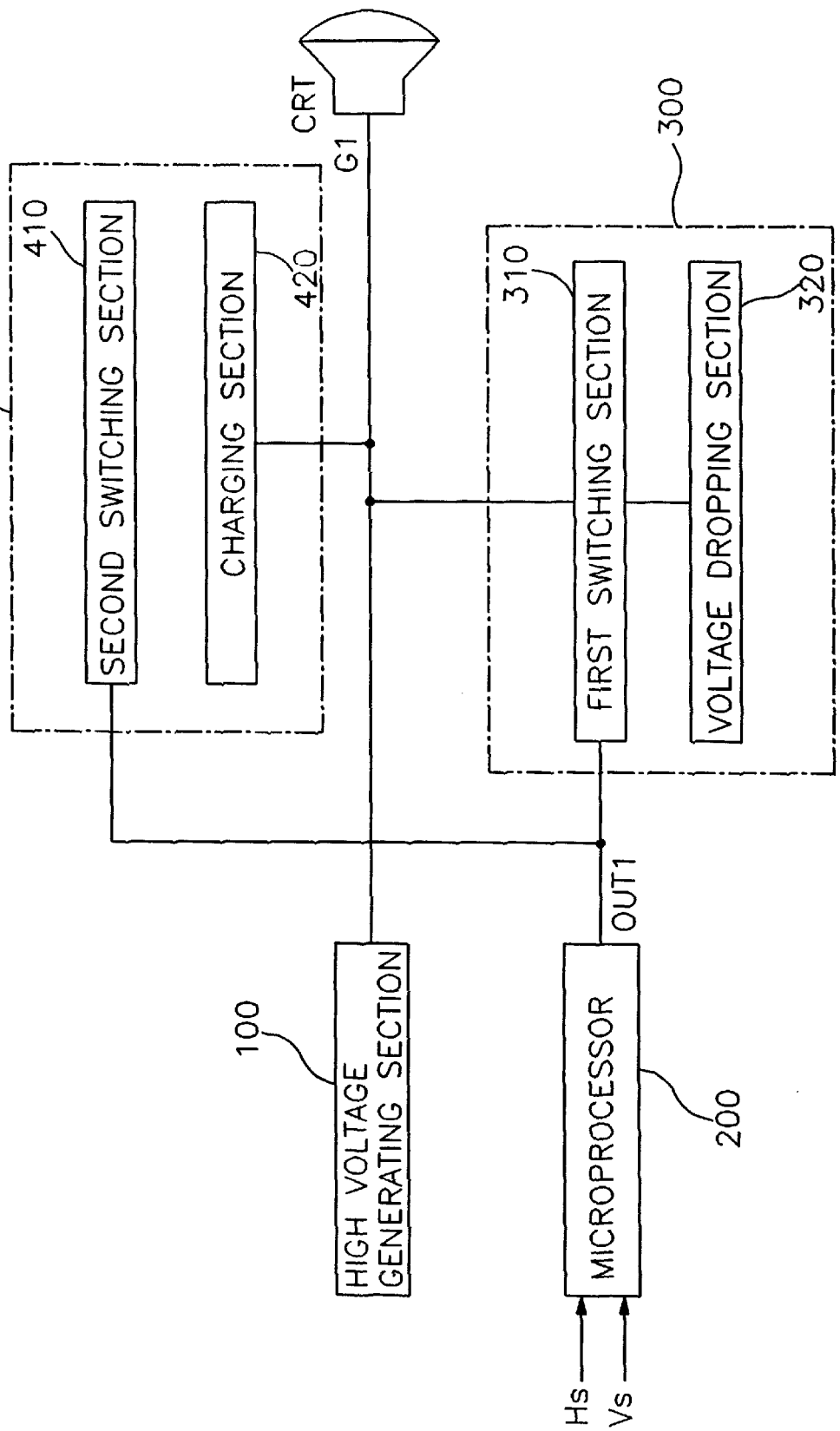
FIG. 3 is a block diagram showing a construction of a CRT protective circuit according to the present invention.

FIG. 3 is a view showing a construction of the CRT protective circuit according to the present invention. Here, a reference numeral 100 denotes a high voltage generating section which generates a high voltage in accordance with an operation of a flyback transformer and supplies the generated high voltage to a grid terminal G1 of the CRT; and 200 is a microprocessor which provides a mute signal OUT1 for eliminating spots in accordance with externally-provided horizontal and vertical sync signals Hs and Vs.

A reference numeral 300 denotes a mute signal processing section for controlling brightness of the spots by controlling the magnitude of an input voltage of grid terminal G1 upon receiving mute signal OUT1; and 400 is a spot killer section for eliminating the spots by controlling the input voltage of grid terminal G1 on the receipt of mute signal OUT1.

Here, mute signal processing section 300 includes a first switching section 310 which is switched in accordance with mute signal OUT1, and a high voltage dropping section 320 which controls the high voltage of grid terminal G1 in accordance with the switching status of first switching section 310.

Also, spot killer section 400 is formed by a second switching section 410 switching in accordance with mute signal OUT1, and a charging section 420 for charging/discharging an externally-provided power supply Vcc3 in accordance with the switching status of second switching section 410 and supplying a backward potential −Vcc3 of discharged power supply Vcc3 to grid terminal G1.

Figure 4:
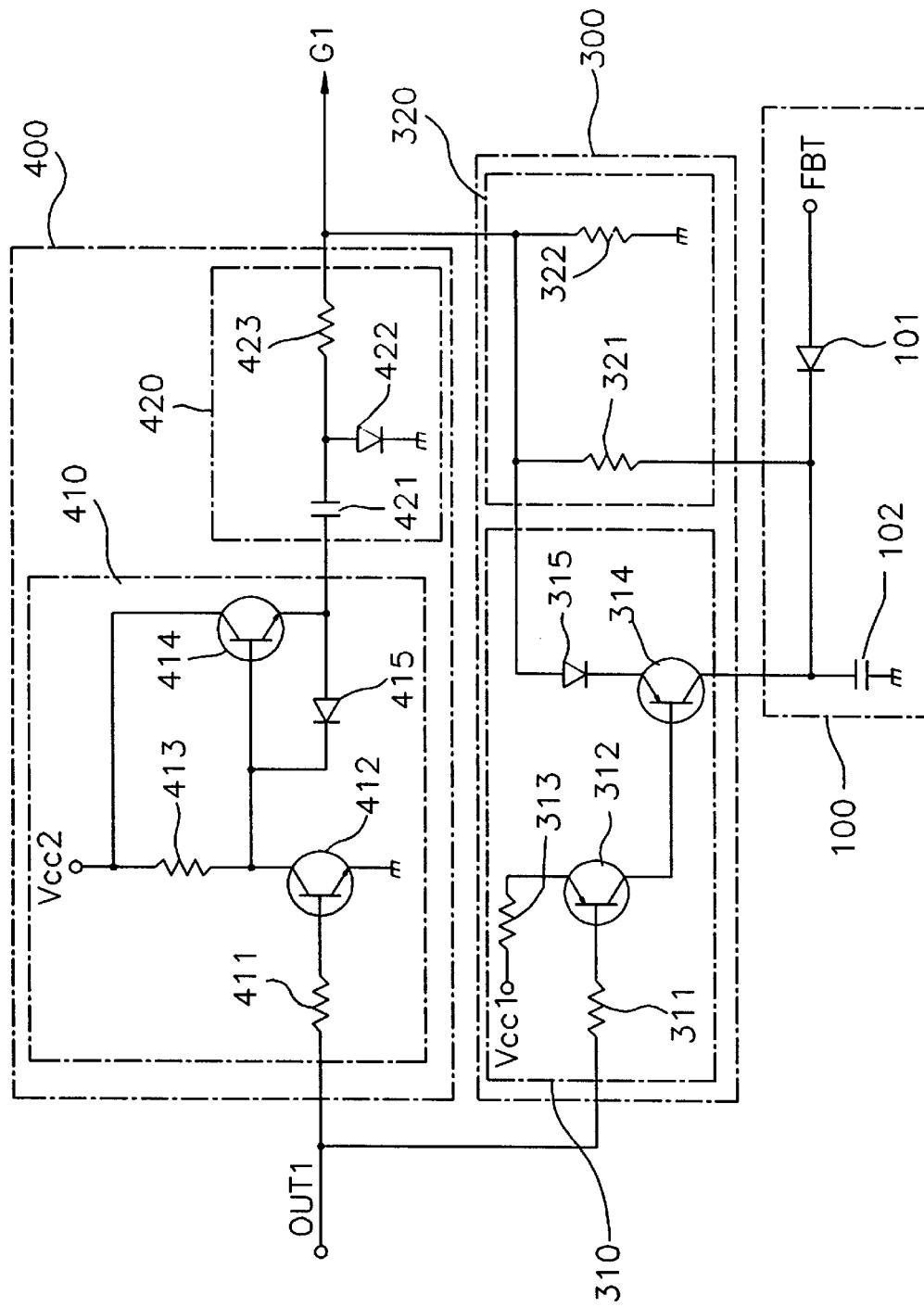
FIG. 4 is a view showing the construction of the CRT protective circuit of FIG. 3 in detail.

FIG. 4 is a view showing the construction of the CRT protective circuit of FIG. 3 in detail. In FIG. 4, high voltage generating section 100 includes a diode 101 for biasing an output voltage of flyback transformer FBT and a capacitor 102 for flattening an output voltage of diode 101.

First switching section 310 is formed by a resistor 311 for biasing mute signal OUT1, and a transistor 312 switching in accordance with an output signal of resistor 311 to supply an externally-provided power supply Vcc1 of about 5 volts toward a collector side thereof. Also included as parts of first switching section 310 are a resistor 313 for controlling output current of transistor 312, a transistor 314 switching in accordance with the switching status of transistor 312, and a diode 315 connected between grid terminal G1 and an emitter side of transistor 314 for protecting transistor 314.

High voltage dropping section 320 is formed by resistors 321 and 322 connected in parallel for dividing the potential of grid terminal G1 in accordance with the switching status of transistor 314 to lower the potential of grid terminal G1.

Second switching section 410 includes a resistor 411 for biasing mute signal OUT1, a transistor 412 switching in accordance with an output signal of resistor 411 for supply an externally-provided power supply Vcc2 of about 200V to an emitter side thereof, and a resistor 413 for determining the quantity of output current of transistor 412. In addition to these, a transistor 414 is switched in accordance with the switching status of transistor 412, and a diode 415 is connected between an emitter side and a base side of transistor 414 for protecting transistor 412.

Charging section 420 has a capacitor 421 for charging/discharging power supply Vcc2 in accordance with the switching status of transistor 414, a diode 422 for shaping a discharging voltage of capacitor 421 into the backward potential, and a resistor 423 for supplying an output voltage of diode 422 to grid terminal G1.

The construction of first switching section 310 will be described in more detail. That is, an output side of resistor 311 for biasing mute signal OUT1 is connected with a base side of transistor 312, and an emitter side of transistor 312 is connected with one side of resistor 313. The other side of resistor 313 is connected to power supply Vcc1.

A collector side of transistor 312 is connected with a base side of transistor 314 which is switched in accordance with the switching status of transistor 312, and an emitter side of transistor 314 is connected with a cathode side of diode 315. Here, transistors 312 and 314 adopt PNP-type transistors as one example.

An anode side of diode 315 is connected to grid terminal G1, and a collector side of transistor 314 is connected to an output side of high voltage generating section 100.

On the other hand, the construction of second switching section 410 will be described in more detail. That is, an output side of resistor 411 for biasing mute signal OUT1 is connected to a base side of transistor 412, and a collector side of transistor 412 is connected with an output side of resistor 413. An input side of resistor 413 is connected with power supply Vcc2, and the collector side of transistor 412 is connected with a base side of transistor 414. An emitter side of transistor 412 is grounded.

An emitter side of transistor 414 is connected with an anode of diode 415. A cathode of diode 415 is connected with a base side of transistor 414, and a collector side of transistor 414 is connected with power supply Vcc2.

The aforementioned CRT protective circuit according to the present invention is operated and effected as follows.

During the normal operation of the monitor, microprocessor 200 generates mute signal of low level which is then supplied to transistor 312 via resistor 311. Transistor 312 is switched in the turn-on state in accordance with mute signal OUT1 of low level. Specifically, since power supply Vcc1 is supplied to the collector side of transistor 312 via resistor 313, transistor 312 provides the switching signal of high level which is in turn supplied to transistor 314.

Transistor 314 is switched in the turn-off state in accordance with the switching signal of high level, and the high voltage of high voltage generating section 100 is supplied to resistors 321 and 322 of high voltage dropping section 320. Resistors 321 and 322 divide the high voltage, and divided high voltage is supplied to grid terminal G1. At this time, the high voltage of high voltage generating section 100 is about −80 volts and the potential of grid terminal G1 is about −60 volts.

On the other hand, mute signal OUT1 of low level is supplied to the base side of transistor 412 via resistor 411 of second switching section 410, and transistor 412 is switched in the turn-off state in accordance with mute signal OUT1 of low level.

That is, power supply Vcc2 is supplied to the base side of transistor 414 via resistor 413, so that transistor 412 provides the switching signal of high level which is supplied to the base side of transistor 414. Then, transistor 414 is switched in the turn-on state in accordance with the switching signal of high level. Consequently, power supply Vcc2 is supplied to the emitter side of transistor 414, and the output voltage of transistor 414 is supplied to capacitor 421 of charging section 420. In turn, capacitor 421 charges the output voltage of transistor 414. Here, the charging voltage of capacitor 421 is approximately 200 volts.

However, when the mode of the monitor is converted, microprocessor 200 provides mute signal OUT1 of high level which is supplied to transistor 312 via resistor 311. Transistor 312 is switched in the turn-off state in accordance with the mute signal of high level to provide the switching signal of low level which is supplied to transistor 314. In other words, power supply Vcc1 cannot be supplied to the collector side of transistor 312.

Transistor 314 is switched in the turn-on state in accordance with the switching signal of low level. That is, the high voltage of high voltage generating section 100 is supplied to diode 315 via transistor 314, and diode 315 supplies the high voltage to grid terminal G1. At this time, the high voltage of high voltage generating section 100 is approximately −80 volts and the potential supplied to grid terminal G1 is also approximately −80 volts.

Meantime, mute signal OUT1 of high level is supplied to the base side of transistor 412 via resistor 411 of second switching section 410, and transistor 412 is switched in the turn-on state in accordance with mute signal OUT1 of high level to provide the switching signal of low level.

Consequently, power supply Vcc2 is supplied to the emitter side of transistor 412 via resistor 413. In accordance with the switching signal of low level, transistor 414 is switched in the turn-off state. Accordingly, capacitor 421 discharges, the discharging voltage of capacitor 421 is supplied to diode 422 which then shapes the discharging voltage of capacitor 421 into the backward potential. The output voltage of diode 422 is supplied to grid terminal G1 via resistor 423. Briefly, the high voltage of high voltage generating section 100 supplied from diode 315 overlaps with the output voltage of diode 422, and the overlap voltage is supplied to grid terminal G1.

Here, since the high voltage of high voltage generating section 100 is approximately −80 volts and the output voltage of diode 422 is approximately −200 volts, the potential of grid terminal G1 is approximately −200 volts.

By employing the CRT protective circuit according to the present invention, the potential of the grid terminal is lowered in accordance with the mute signal of high level during the mode converting operation to be effective in eliminating the spots, reducing the number of output ports of the microprocessor into one, and decreasing the number of externally-provided power supplies.

While the present invention has been particularly shown and described with reference to particular embodiment thereof, it will be understood by those skilled in the art that various changes in form and details may be effected therein without departing from the spirit and scope of the invention as defined by the appended claims. For instance, while in the illustrated preferred embodiment, the monitor is taken as an example, it may alternately be applied to all video signal processing systems such as a general television.

What is claimed is:

1. A CRT protective circuit comprising:
   a microprocessor having an output port providing a mute signal for eliminating spots in accordance with externally-provided horizontal and vertical sync signals;
   high voltage generating means for generating a high voltage in accordance with an operation of a flyback transformer;
   mute signal processing means for controlling brightness of said spots by controlling an output voltage of said high voltage generating means in accordance with said mute signal, said mute signal processing means including:
      first switching means for being switched on and off in accordance with said mute signal and for supplying said output voltage of said high voltage generating means to a grid terminal; and
      high voltage dropping means for dividing said output voltage of said high voltage generating means in accordance with the switching status of said first switching means and for supplying said divided output voltage to said grid terminal; and
   spot killer means for eliminating said spots by supplying an externally-provided voltage to said grid terminal in accordance with said mute signal of said microprocessor, wherein said spot killer means includes:
      second switching means for switching in accordance with said mute signal in order to provide said externally-provided voltage; and
      charging means for charging/discharging an output voltage of said second switching means and supplying a negative component of the discharging voltage to said grid terminal.

2. The CRT protective circuit as claimed in claim 1, wherein said first switching means comprises:
   a first resistor for biasing said mute signal;
   a first transistor for supplying said externally-provided voltage to a collector side thereof in accordance with an output signal of said first resistor;
   a second resistor connected to said collector side of said first transistor for controlling output current of said first transistor; and
   a second transistor for supplying said output voltage of said high voltage generating means to said grid terminal in accordance with the switching status of said first transistor.

3. The CRT protective circuit as claimed in claim 2, further comprising a diode connected between an emitter side of said second transistor and said grid terminal for protecting said second transistor.

4. The CRT protective circuit as claimed in claim 1, wherein said high voltage dropping means comprises:
   a third resistor connected to an output side of said high voltage generating means; and
   a fourth resistor connected between an output side of said third resistor and said grid terminal,
   whereby said high voltage of said high voltage generating means is divided.

5. The CRT protective circuit as claimed in claim 1, wherein said second switching means comprises:
   a fifth resistor for biasing said mute signal;
   a third transistor switching in accordance with an output signal of said fifth resistor for supplying said externally-provided voltage to an emitter side thereof;
   a sixth resistor for determining the quantity of output current of said third transistor; and
   a fourth transistor switching in accordance with the switching status of said third transistor for supplying said externally-provided voltage to said charging means.

6. The CRT protective circuit as claimed in claim 5, further comprising a second diode connected between an emitter side and a base side of said fourth transistor for protecting said fourth transistor.

7. The CRT protective circuit as claimed in claim 1, wherein said charging means comprises:
- a first capacitor for charging/discharging said externally-provided voltage in accordance with the switching status of said fourth transistor;
- a third diode for shaping said discharging voltage of said first capacitor; and
- a seventh resistor for supplying an output voltage of said third diode to said grid terminal.

8. The CRT protective circuit as claimed in claim 1, wherein said externally-provided voltage is approximately 200 volts and higher.

9. A CRT protective circuit comprising:
- a microprocessor providing a single mute output for generating a mute signal in accordance with externally-provided horizontal and vertical sync signals and a voltage sensing signal;
- high voltage generating means for generating a high voltage in accordance with an operation of a flyback transformer;
- first switching means for switching in accordance with said mute signal for supplying said high voltage of said high voltage generating means to a grid terminal, wherein said first switching means includes:
  - a first resistor for biasing said mute signal;
  - a first transistor for supplying an externally-provided voltage to a collector side thereof in accordance with an output signal of said first resistor;
  - a second resistor connected to said collector side of said first transistor for controlling output current of said first transistor; and
  - a second transistor for supplying said output voltage of said high voltage generating means to said grid terminal in accordance with the switching status of said first transistor;
- high voltage dropping means for dividing an output voltage of said high voltage generating means in accordance with the switching status of said first switching means and supplying the divided output voltage to said grid terminal to control brightness of spots, wherein said high voltage dropping means includes:
  - a third resistor connected to an output side of said high voltage generating means; and
  - a fourth resistor connected between an output side of said third resistor and said grid terminal, wherein said high voltage of said high voltage generating means is divided by said fourth resistor;
- second switching means for switching in accordance with said mute signal for supplying said externally-provided voltage, wherein said second switching means includes:
  - a fifth resistor for biasing said mute signal;
  - a third transistor switching in accordance with an output signal of said fifth resistor for supplying said externally-provided voltage to an emitter side thereof;
  - a sixth resistor for determining the quantity of output current of said third transistor; and
  - a fourth transistor for being switched in accordance with the switching status of said third transistor for supplying said externally-provided voltage to a charging; and
- said charging means for charging/discharging an output voltage of said second switching means, and supplying a negative component of the discharging output voltage to said grid terminal to eliminate said spots, wherein said charging means includes:
  - a first capacitor for charging/discharging said output voltage in accordance with the switching status of said fourth transistor;
  - a third diode for shaping said discharging output voltage of said first capacitor; and
  - a seventh resistor for supplying an output voltage of said third diode to said grid terminal.

* * * * *